United States Patent Office 3,202,477
Patented Aug. 24, 1965

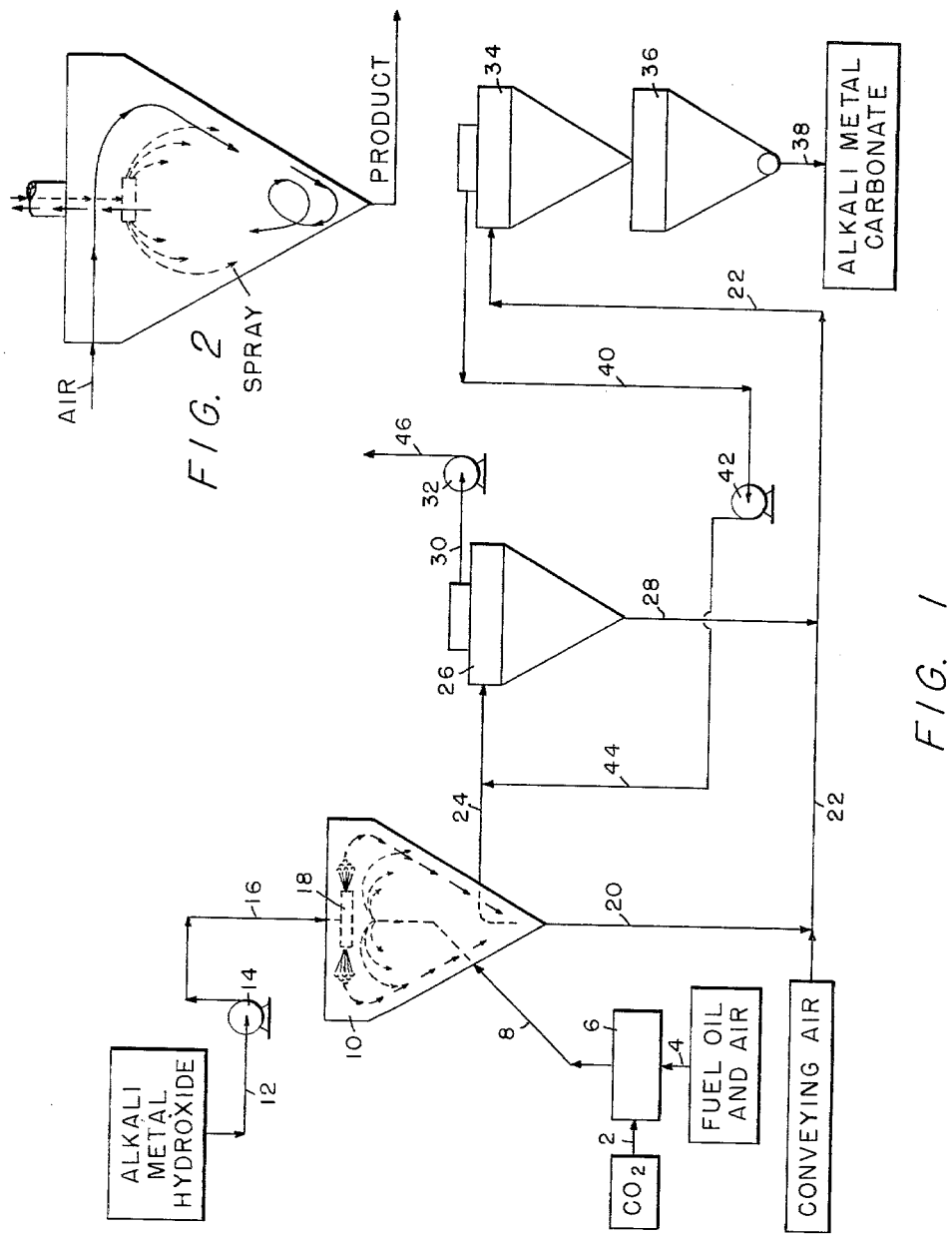

3,202,477
METHOD OF PRODUCING ALKALI METAL CARBONATE
John E. Loeffler, Jr., Lyndhurst, Robert A. Springer, North Madison, and Ernest L. Bolick, Painesville, Ohio, assignors to Diamond Alkali Company, Cleveland, Ohio, a corporation of Delaware
Filed Jan. 18, 1962, Ser. No. 167,088
14 Claims. (Cl. 23—63)

This invention relates to a process for producing alkali metal carbonates, and more particularly to a process for producing alkali metal carbonates from alkali metal hydroxides, by contact of a solution of alkali metal hydroxide in particulate or comminuted form with a gas containing carbon dioxide, at a temperature and relative humidity such that water is evaporated from the solution and the hydroxide is converted to the alkali metal carbonate.

This application is a continuation-in-part of our application Serial No. 772,865, filed November 10, 1958, now abandoned.

The alkali metal carbonates, and in particular sodium, lithium and potassium carbonates, are among the most important industrial chemicals in use at the present time. These compounds find extensive applications in a wide variety of industrial uses.

To the glass industry, which is the largest single consumer of alkali metal carbonates, these compounds are an indispensible ingredient in its products. Also, large quantities of the alkali metal carbonates are consumed in the soap and detergent industry. Likewise, the pulp and paper industry makes extensive use of these compounds in the pulping of hardwoods. Other industries which use substantial quantities of the alkali metal carbonates include the textile and dye industry, the ceramic industry and the petroleum industry. Because of this great demand for the alkali metal carbonates, methods of producing these compounds from their precursors are of great importance to industry as a whole.

Although, at present, the major portion of the sodium carbonates are prepared by the ammonia-soda or Solvay process, commercially the most important of the alkali metal carbonates, a great deal of effort has been expended in recent years to develop processes by which the sodium as well as the other alkali metal carbonates could be prepared from the corresponding alkali metal hydroxides. The interest in such processes has been brought about by a decrease in the demand for the alkali metal hydroxides, which are generally produced with chlorine, primarily by the electrolysis of alkali metal chloride brine.

It has been proposed to treat a solution of alkali metal hydroxide with carbon dioxide, by passing the stream of carbon dioxide gas through the hydroxide solution, as in an absorption tower. This may result in the formation of an alkali metal bicarbonate, if sufficient carbon dioxide is used, much in the same manner as the ammonia-soda or Solvay process. Following the conversion of the hydroxide to the bicarbonate, as in the ammonia-soda process, the bicarbonate is separated from the solution as a crystalline mass and then calcined to produce the corresponding alkali metal carbonate. Although a commercially satisfactory grade of alkali metal carbonate is produced by this method, it has not proved entirely satisfactory, because of the requirement of a large amount of equipment, e.g., a carbonation tower in which to convert the hydroxide to a solution of the carbonate, and then to the bicarbonate as a crystalline precipitate, a filtering or centrifuging mechanism to separate the bicarbonate from the solution, and a calciner to re-convert the bicarbonate back to the carbonate.

Heretofore it has also been proposed to prepare an alkali metal carbonate by injecting a solution of alkali metal hydroxide, in the form of a fine spray of discrete particles into a fluidized bed of the corresponding alkali metal carbonate. This fluidized bed is made up of alkali metal carbonate fines (particle diameter approximately .074 mm.) and is supported by and suspended in a stream of hot gas containing carbon dioxide. In this process, the alkali metal hydroxide, in intimate admixture with the carbon dioxide and the alkali metal carbonate, is transformed into more alkali metal carbonate, and removed from the reactor countercurrently from the carbon dioxide gas. The carbonate thus produced is said to have an average particle diameter of about 0.2 mm.

Although, on a theoretical basis this process appears not to be complex, in practice difficulty is encountered, particularly in the separation of the alkali metal carbonate product and the alkali metal carbonate fluidized bed. Moreover, by this process, it is not feasible to obtain a light product of controllable density, since the carbonate produced will always have contact with the solution of alkali metal hydroxide or partially carbonated alkali metal hydroxide and for this reason will have a density of about 1000 g./l. For these reasons, this process has not been satisfactory for a wide range of uses requiring a broader range of physical properties.

It is therefore an object of this invention to provide a simplified method of producing alkali metal carbonates from the corresponding alkali metal hydroxides.

Another object of this invention is to provide a method of producing alkali metal carbonates from alkali metal hydroxides, which method is easily adapted for use in a continuous operation and by which method alkali metal carbonates having a wide range of bulk densities may be produced.

A further object of this invention is to provide a method for producing alkali metal carbonates from alkali metal hydroxides, which method incorporates the use of a minimum of expensive equipment and capital investment.

These and other objects will become apparent to those skilled in the art from the description and drawings of the invention which follow.

Pursuant to the above objects, it has been found that an alkali metal hydroxide solution may be conveniently converted into an alkali metal carbonate by comminuting a stream of the solution of the alkali metal hydroxide in an atmosphere containing carbon dioxide, in such a manner that the flow of the atmosphere of carbon dioxide impinges upon the stream of particles of alkali metal hydoxide solution so as to cause evaporation of water from the solution and reaction of the alkali metal hydroxide to form alkali metal carbonate, and there results a generally concurrent flow of the atmosphere containing carbon dioxide and particles of alkali metal hydroxide and reaction products thereof with carbon dioxide, whereby a dry alkali metal carbonate is produced by the simultaneous conversion of the hydroxide and the evaporation of free water.

It is to be understood that as used in the specification and claims, the term "alkali metal carbonates," "hydroxides," etc., refer to compounds of lithium, sodium, potassium, cesium and rubidium. However, because of their ready availability, low cost, and commercial importance, the compounds of lithium, sodium, and potassium are preferred, and for this reason in the description of the invention which follows, primary reference will be made to these compounds, particularly sodium and potassium. Additionally, as used hereinafter, the term "solution" is intended to include a solid suspended in a liquid, i.e., a slurry, as well as a liquid encased in a solid crystalline mass.

Finally, the words "particulate," "comminuted," "atomize," or "finely divided," or their equivalents, as used hereinafter, refer to the forming of relatively small discrete particles, and to materials formed by dehydration or carbonation of such particles.

The method of the present invention envisions first the comminuting and second the carbonation and drying of a solution of an alkali metal hydroxide in an atmosphere of carbon dioxide, as described above, whereby the following reaction takes place:

$$2MOH + H_2O + CO_2 \xrightarrow[>200°\ F.]{\Delta} M_2CO_3 + 2H_2O \nearrow$$

wherein M is one of the alkali metals.

In the preferred method of operation, a solution of an alkali metal hydroxide, such as lithium, sodium, or potassium hydroxide, is delivered to a reaction zone wherein, in contact with heated carbon dioxide-containing gas it is comminuted under conditions of temperature and relative humidity such that alkali metal hydroxide solution reacts with the carbon dioxide, forming an alkali metal carbonate, and by reason of contact with the heated carbon dioxide gas, water is vaporized and the particles are dried as they are formed. Although, any suitable apparatus may be used, in which the alkali metal hydroxide solution can be finely divided or comminuted and contacted with heated carbon dioxide-containing gas, apparatus commonly known as spray dryers have been found to be particularly adaptable to the method of the present invention.

In such apparatus, the comminuting or atomizing of the alkali metal hydroxide solution and the reaction with the carbon dioxide, with the simultaneous formation and drying of the alkali metal carbonate, is carried out in the drying chamber of the spray dryer and the dry alkali metal carbonate product, entrained in the atmospheric gases of the dryer, is collected in one or more collection cyclones through which the gases are passed. In this manner, by varying the conditions of temperature, relative humidity, and atomizing of the solution, under which the process is carried out, an alkali metal carbonate can be made having a particle diameter ranging from .149 to .004 mm. and having a bulk density of 1000 to 400 g./l.

In the practice of the present invention, it has been found that the alkali metal hydroxide solution used may vary greatly in concentration, the only requirement being that the viscosity of the solution is such that it is readily dispersible in the carbon dioxide-containing gas in the form of finely divided particles. However, although a slurry of the alkali metal hydroxide in its solution or, where it is desired to increase the particle size and bulk density of the alkali metal carbonate, as will be explained in more detail hereinafter, a slurry of the alkali metal carbonate in the alkali metal hydroxide solution may be used, generally, excellent results are obtained when using a solution containing about 50% by weight of the total solution of alkali metal hydroxide.

It is also desirable in the practice of the present invention, for complete conversion of hydroxide to carbonate, to use an excess of carbon dioxide over the stoichiometric amount required in the reaction zone to completely convert all of the alkali metal hydroxide to alkali metal carbonate. While, the exact amount of excess carbon dioxide has not been found to be critical, superior results are obtained when an excess of about 10 to 30% carbon dioxide is used.

It will be appreciated that the purity of the alkali metal carbonate product of the present invention depends primarily on the purity of the reactants, i.e., the alkali metal hydroxide and carbon dioxide, which is used, inasmuch as impurities in the reactants will be carried over into the carbonate product. Thus, where it is desired to produce an alkali metal carbonate having a low impurity content, without the necessity for an additional purification step, the alkali metal hydroxide and carbon dioxide which are used, must themselves, be low in impurities. In such instances, the alkali metal hydroxides produced by the electrolysis of an alkali metal halide solution in a mercury cathode electrolytic cell, have been found to be suitable, while carbon dioxide produced for commercial use, as for example, that from tank cars and pressurized cylinders, has been found to have an impurity content sufficiently low for use in the present process. It is to be understood also, however, that in many applications impurities in the alkali metal carbonate are of no great consequence, e.g., when it is used in the manufacture of certain types of glass and paper. Thus, when the alkali metal carbonate produced by the method of the present invention is to be used in such applications, the impurities in the reactants will not be detrimental and alkali metal hydroxides and carbon dioxide from any sources may be used, without adversely affecting the product obtained in the present process.

The bulk density and particle size of the alkali metal carbonate produced by the present method, are found to be affected by three factors: first, by the particle size of alkali metal hydroxide solution; second, by the temperature at which the dehydration and carbonation reaction between the alkali metal hydroxide in solution and carbon dioxide are carried out; and third, by recycling a portion of the alkali metal carbonate product, as a slurry in the alkali metal hydroxide feed.

Referring now to the first of these factors, in accordance with the method of the present invention when the alkali metal hydroxide solution is introduced into a suitable reaction chamber, as for example, the drying chamber of a spray dryer, it is initially broken up into discrete particles. This may be done in any convenient manner, e.g., by pumping the solution onto a rotating atomizer wheel or a propeller, by pumping it through a spray nozzle, or in any other manner, the exact method by which the particles of the alkali metal hydroxide solution are formed is immaterial to the method of the present invention. Once particles of the alkali metal hydroxide solution have been formed, there will be a characteristic particle size for the alkali metal carbonate obtained and variations in the size of the solution particles initially produced will give similar variations in the size of the alkali metal carbonate particles. The manner in which the variations of particle size of the solution is obtained will depend upon what mechanical means for forming the particles is used, i.e., if the solution is directed onto a rotating atomizer wheel or propeller, variation in the speed of the wheel or propeller will vary the particle size of the solution. Similarly, if a spray nozzle is used to form the particles of solution, orifice, or orifices if there be more than one, in the spray nozzle will likewise produce variations in the particle size of the solution. In this manner, the particle size of the alkali metal carbonate product can readily be made to vary, if desired, between 0.149 and 0.004 mm.

Referring to the second of these factors, when the reactants, i.e., the alkali metal hydroxide solution and the carbon dioxide, are brought into contact in the reaction chamber, variations in the temperature of the carbon dioxide and alkali metal hydroxide will also cause variations in the bulk density of the alkali metal carbonate product.

In this regard, temperatures within the reaction zone may vary widely at specific points because of the chemical and physical conditions extant therein in bringing the carbonation reaction (exothermic) and dehydration (endothermic) to substantial completion.

For example, at the point of impingement of the stream of the carbon dioxide-containing gas and the stream of particles of alkali metal hydroxide solution, the maximum temperature ordinarily will be achieved, and from there to the points at which the residual gases and the product are withdrawn from the reaction zone the temperature will depend, among other things, upon relative humidity of the carbon dioxide gas introduced into the reaction zone, the temperature of the alkali metal hydroxide solution, the amounts of alkali metal hydroxide in the solution and carbon dioxide in the gases introduced into the reaction zone, and the difference in relative humidity of the gas at the point of introduction and in the region where the carbonation reaction and dehydration are substantially complete.

Accordingly, for purposes of controlling physical characteristics of the products obtainable by the method of the present invention, the maximum and minimum temperature conditions of concern are the temperature of the carbon dioxide-containing gas introduced into the reaction zone and an indication of the average minimum reaction temperature with the reaction zone. The average minimum reaction temperature within the reaction zone, which may conveniently be taken as the average temperature of the carbon dioxide and other residual gases withdrawn from the chamber, is quite naturally affected by the inlet temperature of the carbon dioxide-containing gases as well as by the temperature and rate of flow of the alkali metal hydroxide solution. It has been found, that the lowest average minimum reaction temperature which is effective in producing a suitable product is 200° F. (93° C.), with very good results obtained when the average minimum reaction temperature is above 300° F. (149° C.), and preferred temperatures, especially when producing sodium and/or potassium carbonates, being of the order of 400° F. (204° C.), and above. No critical maximum temperature has been found short of melting point of the carbonate produced, or the highest temperature which can be tolerated by the materials of construction of the apparatus in the reaction is carried out.

When operating the present process under the above temperature conditions, it is found that as the average minimum reaction temperature is increased, the bulk density of the carbonate product is likewise generally increased, and at the preferred average minimum reaction temperature of 400° F. (204° C.), and above, the alkali metal carbonate product has a bulk density of 700 g./l., and above.

Additionally, it has been found that where the average minimum reaction temperature is below 200° F., an increasingly large amount, e.g., 1% and more, of alkali metal hydroxide generally remains in the alkali metal carbonate. The inclusion of such relatively large amounts of unreacted alkali metal hydroxide may, for some purposes, necessitate an additional separation or carbonation step to assure a sufficiently pure alkali metal carbonate product. However, when operating the present method with an average minimum reaction temperature of 400° F. (204° C.), and above, the amount of alkali metal hydroxide impurity in the alkali metal carbonate product is generally found to be less than 0.1%.

Referring now to the third factor, it has been found that recycling a portion of the carbonate product as a slurry in the alkali metal hydroxide feed solution, increases both the bulk density and the particle size of the product. Where the reaction of the alkali metal hydroxide solution as discrete particles and the carbon dioxide is carried out in the drying chamber of a spray dryer and portions of the product are recovered from both the drying chamber and from a collection cyclone, the product from the collection cyclone, and if desired, a portion of that from the spray drying chamber may be recycled as a slurry in the alkali metal hydroxide feed solution. It is axiomatic, in such instance, that the particle size of the alkali metal carbonate should be less than the smallest orifice through which the suspension must pass, and in order to insure this condition wire cloth, or other filter material, of suitable porosity may be used to remove the larger particles from the suspension. The feed solution, containing the alkali metal carbonate in suspension is broken up into discrete particles in the regular manner and reacted, within the reaction chamber, with hot carbon dioxide-containing gas. The alkali metal carbonate, thus-produced, is generally found to have a bulk density and particle diameter greater than that of the carbonate which has not been recycled.

It will be appreciated that, although the particle size and bulk density of the carbonate product may be varied to some extent by any one of the above factors, successful operation of the process to produce material of a desired particle size may require a correlation and utilization of all three.

Referring now to the drawings:

FIG. 1 represents a system wherein parallel, or concurrent, flow of gases, liquid particles, and dry product is involved; and FIG. 2 represents a reaction zone only of FIG. 1 employing mixed flow, i.e., parallel and countercurrent flow of gases, liquid particles, and dry product.

In FIG. 1, an alkali metal hydroxide solution is passed through line 12 to a pump 14 whereby it is pumped through line 16 into the drying chamber 10 of a spray dryer. Therein, it is comminuted or broken up into discrete particles by means 18. Heat for the dehydration and reaction is obtained by the burning of hydrocarbon fuel, as for example fuel oil, with air or oxygen, in the heater means 6. Where heater 6 is a direct fired heater and the carbon dioxide formed by the burning of the fuel in the heater is insufficient to supply the desired excess amount of carbon dioxide to the reaction chamber, additional carbon dioxide can be added to the heater by means of line 2. Additionally, where heater 6 is an indirect fired heater, i.e., the gas for the reaction chamber does not come in direct contact with the burning fuel, all of the carbon dioxide for the reaction will be supplied from some external source through line 2. From the heater 6, the stream of hot carbon dioxide-containing gases is passed through line 8 into the interior of the chamber 10, so as to impinge upon the stream of particles of alkali metal hydroxide solution, reacting therewith to form alkali metal carbonate as the streams move in parallel or concurrent flow, the particulate material being simultaneously dehydrated at the high temperature of the gases within the reaction chamber.

The major portion, 70% or more, constituting the larger particles of the thus-formed carbonate drops to the bottom of the reaction chamber 10 and is removed as at line 20, through line 22 under the effects of the conveying air. From line 22, the product passes into the conveying and collection cyclones 34 and 46, respectively, from which latter, it is removed, as at 38, as the final product. The remaining 30% or less, of the smaller particles of the alkali metal carbonate, is entrained in the gases within the reaction chamber 10 and is removed therefrom as at line 24 and passes into the main cyclone 26. Within the main cyclone 26, the entrained carbonate particles in the exhaust gases are separated therefrom and recovered from the bottom of the cyclone as at line 28, from which it passes through line 22 into the conveying and collection cyclones 34 and 36 and is recovered from the latter as at 38. Where it is desired to further increase the product particle size and bulk density, all or any portion of the carbonate removed at 38 may be recycled into the alkali metal hydroxide feed solution, forming a slurry therewith. This slurry may then be pumped into the reaction chamber 10, broken up into discrete particles by means 18, contacted with the impinging stream of hot carbon dioxide-containing gases, and the product recovered from the cyclones as described above.

The exhaust gases are removed from the top of cyclone 26 as at 30 by means of pump 32, from which they pass to the exhaust 46. Additionally, in order to recover any alkali metal carbonate entrained in the conveying air which passes through line 22, this conveying air with entrained solid material, is removed from the top of conveying cyclone 34 and returned to the main cyclone 26 for further separation, by means of line 40, pump 42, and lines 44 and 24. Although, only one main cyclone has been shown, it is to be understood that in actual practice, two or more cyclones may be utilized, with the exhaust gas from the first passing into the next, thereby recovering better than 95% of the alkali metal carbonate which is produced.

In FIG. 2 the arrangement in the reaction zone, or drying chamber, for introducing the stream of particles of liquid and the impinging stream of hot carbon dioxide-containing gases is such that both parallel, or concurrent, flow and countercurrent flow is involved. In this arrangement the hot gases (solid lines) are introduced in a direction tangent to the inner wall surface of the cylindrical upper portion of the chamber, as shown, and impinge upon or contact the stream of liquid particles (discontinuous lines) as they are thrown from the centrally located atomizing device toward the periphery of the reaction zone. From the region of impingement, or initial contact, of the hot carbon dioxide-containing gases and liquid particles, the two streams move in parallel, or concurrent, flow while the carbonation reaction and dehydration are taking place as the particles move generally helically downwardly toward the bottom of the reaction zone. Then in the region of the bottom of the reaction zone, the direction of the stream of gas is reversed upwardly toward the top of the reaction zone (as shown) moving through the stream of liquid particles, the temperature and rate of flow of the entering gas stream, and size of liquid particles, being so regulated that few if any of the liquid particles are carried out of the reaction zone by the residual gases in their movement toward the exhaust part of the reaction zone.

In order that those skilled in the art may better understand the principles of the method of the present invention and how it may be practiced, the following examples are given.

In Examples 1 to 6, the dryer-reactor is one form of a generally concurrent type, in which the drying gases enter the drying chamber of the spray dryer in a direction countercurrently to the direction of the particles of alkali metal hydroxide solution, and then impinge upon the stream of liquid particles as it enters the reaction zone and at the walls of the reaction zone, the gas stream is turned so that both streams flow concurrently. In all these examples, 1 to 6, the mixture of gases with entrained fine carbonate materials from the drying chamber are passed through two main cyclones, thereby achieving better than 95% recovery of the product, and atomization of the hydroxide solution is obtained by pumping the solution onto a rapidly rotating 24-vane atomizer wheel.

*Example 1*

An aqueous solution of sodium hydroxide containing 50% by weight sodium hydroxide is pumped into a spray dryer of the type described above at the rate of 3,290 pounds per hour. Fuel oil at the rate of 68 pounds per hour is burned in the direct fired burner of the spray dryer, producing carbon dioxide at the rate of 212 pounds per hour. To this carbon dioxide is added 1,030 pounds per hour of carbon dioxide from a cylindrical tank, and the total of the two amounts of carbon dioxide is pumped into the spray dryer. The inlet temperature of the carbon dioxide and other gases is 750° F. (400° C.), and the outlet temperature is 225° F. (107° C.), which latter temperature is taken as the average minimum reaction temperature in the spray dryer. The sodium hydroxide solution is atomized in the spray dryer, the speed of the atomizer wheel being 11,000 r.p.m. The sodium carbonate is removed from the spray dryer as it is formed, the average residence time in the spray dryer of any given portion of the material being 21.6 seconds. An analysis of the sodium carbonate shows that it contains .94% sodium hydroxide and has a bulk density of 465 g./l.

*Example 2*

An aqueous solution of sodium hydroxide containing 50% by weight sodium hydroxide is pumped into a spray dryer of the type referred to above, at the rate of 1,930 pounds per hour. 79 pounds per hour of fuel oil are burned in the direct fired burner of the spray dryer, producing 246 pounds per hour of carbon dioxide. 882 pounds per hour of carbon dioxide from a cylindrical tank are added to the 246 pounds per hour of carbon dioxide from the fuel oil combustion making a total of 1,128 pounds per hour of carbon dioxide, which is added to the spray dryer. The inlet temperature of the carbon dioxide and combustion gases is 800° F. (427° C.), and the outlet temperature is 250° F. (121° C.). The sodium hydroxide solution is atomized within the spray dryer, the speed of the atomizer wheel being 12,770 r.p.m. The sodium carbonate produced is removed from the spray dryer as it is formed, the average residence time of a given portion of material in the spray dryer being 30.6 seconds. The sodium carbonate product is found to have a bulk density of 574.4 g./l. and contains .66% sodium hydroxide.

*Example 3*

1,350 pounds per hour of an aqueous sodium hydroxide solution containing 50% by weight sodium hydroxide is pumped into a spray dryer of the type described above. 79 pounds per hour of fuel oil is burned in the direct fired burner of the spray dryer, producing 246 pounds per hour carbon dioxide, to which is added 720 pounds per hour carbon dioxide from a cylindrical container. The total of 966 pounds per hour of carbon dioxide is pumped into the spray dryer with the gases of combustion at an inlet temperature of 800° F. (427° C.), and an outlet temperature of 300° F. (150° C.). The sodium hydroxide solution is atomized within the spray dryer, the speed of the atomizer wheel being 18,000 r.p.m. The average residence time of a given portion of the material within the spray dryer is 31.2 seconds. The sodium carbonate product formed is found to have a bulk density of 606.4 g./l. and contains .37% sodium hydroxide.

*Example 4*

862 pounds per hour of an aqueous sodium hydroxide solution, containing 50% by weight sodium hydroxide is pumped into a spray dryer of the above described type, wherein it is atomized, the speed of the atomizer wheel being 13,250 r.p.m. 79 pounds per hour fuel oil are burned in a direct fired burner of the spray dryer, producing 246 pounds per hour carbon dioxide. To this is added 638 pounds per hour carbon dioxide from a tank truck making a total of 884 pounds per hour of commercial carbon dioxide. This carbon dioxide is pumped into the spray dryer with the gases of combustion at an inlet temperature of 800° F. (427° C.), and an outlet temperature of 350° F. (177° C.). The average residence time of a given portion of the material within the spray dryer is 30.7 seconds. The sodium carbonate product formed has a bulk density of 657.6 g./l. and contains .15% sodium hydroxide.

*Example 5*

900 pounds per hour of an aqueous solution of sodium hydroxide containing 50% by weight sodium hydroxide is added to a spray dryer of the above described type, wherein it is atomized, the speed of the atomizer wheel being 13,250 r.p.m. 96 pounds per hour of fuel oil are burned in the direct fired heater of the spray dryer, producing 299 pounds per hour of carbon dioxide. To this carbon dioxide is added 461 pounds of commercial carbon dioxide per hour from a cylindrical container. The total carbon dioxide, 760 pounds per hour, with the gases of combustion, is added to the spray dryer at an inlet temperature of 875° F. (468° C.), and an outlet temperature of 400° F. (205° C.). The residence time of a given portion of the material within the spray dryer is 30.3 seconds. The sodium carbonate formed has a bulk density of 764.8 g./l. and contains .10% sodium hydroxide.

*Example 6*

528 pounds per hour of an aqueous solution of sodium hydroxide, containing 50% sodium hydroxide by weight of the solution, is added to a spray dryer of the above described type, wherein it is atomized, the speed of the atomizer wheel being 13,250 r.p.m. 96 pounds per hour of fuel oil are burned in the direct fired heater of the spray dryer, producing 299 pounds per hour carbon dioxide, to which commercial carbon dioxide is added 264 pounds per hour from a cylindrical container. The total of 563 pounds per hour of carbon dioxide and the other gases of combustion are pumped into the spray dryer at an inlet temperature of 1,040° F. (560° C.), and an outlet temperature of 500° F. (260° C.). The average residence time of a given portion of the material in the spray dryer is 29.3 seconds. The sodium carbonate product formed has a bulk density of 912.4 g./l. and contains .03% sodium hydroxide by weight.

From the above, it can be seen that by increasing the outlet temperature of the carbon dioxide and gases of combustion, the sodium carbonate product produced has an increasingly greater bulk density and contains a decreasingly smaller percentage of sodium hydroxide. Thus, by the method of the present invention, an alkali metal carbonate is produced from the corresponding alkali metal hydroxide in one simple operation. Moreover, by varying the temperature at which the reaction takes place and the size of the alkali metal hydroxide particles, the bulk density of the alkali metal carbonate is also varied, thereby making possible the production of an alkali metal carbonate having a wide range of bulk densities.

In Examples 7 to 12 inclusive, the carbonation-dehydration apparatus used is 4 feet 6 inches internal diameter incorporating the parallel flow principle for introducing the particles of liquid and hot reaction gases, i.e., the gas mixture and liquid particles flow parallel in the reaction zone and the gas and solids are separated at the bottom of the reaction zone. A mixture of 4,620 pounds of a solution containing 45% potassium hydroxide and 1,300 pounds of a solution containing 50% of sodium hydroxide (theoretically producing a mixture of 75% $K_2CO_3$ and 25% $Na_2CO_3$) are introduced into the spray dryer through a rotary spray nozzle effectively breaking the liquid into a stream of small particles at the pressures (p.s.i.g.) noted in the table below. The carbon dioxide-containing gases are derived solely from hydrocarbon combustion, and the average minimum reaction temperature (of the residual exhaust gases) is maintained as nearly as feasible at about 300° F. (155° C.), while varying the liquid feed rate, inlet hot gas temperature, and excess carbon dioxide. The difference between 100% "conversion" and the results given in the table constitute a mixture of KOH, NaOH and moisture.

| Examples | 7 | 8 | 9 | 10 | 11 | 12 |
|---|---|---|---|---|---|---|
| Atomizing pressure (p.s.i.g.) | 3,500 | 3,500 | 1,800 | 1,900 | 1,800 | 3,000 |
| Air rate (s.c.f.m.) | 4,000 | 2,600 | 3,200 | 2,100 | 3,100 | 2,400 |
| Residence time (sec.) | 4.2 | 6.4 | 5.2 | 7.9 | 4.3 | 6.9 |
| Inlet temperature (°F.) | 350 | 400 | 400 | 450 | 450 | 600 |
| Outlet temperature (°F.) | 304–300 | 300 | 304 | 304 | 298–302 | 500 |
| Density (lbs./ft.³) | 35.8 | 35.6 | 34.9 | 32.4 | 30.6 | 36.6 |
| Combustion (lbs./hr.)* | 145 | 111 | 137 | 104 | 154 | 167 |
| Required $CO_2$ (lbs./hr.)* | 54 | 54 | 81 | 81 | 147 | 51 |
| Percent excess $CO_2$* | 170 | 107 | 69 | 28 | 5 | 188 |
| Percent conversion | 97.18 | 98.1 | 98.0 | 98.26 | 93.65 | 99.36 |

*Theoretical.

From the above it appears that the NaOH in the mixture reacts with the carbon dioxide more rapidly than the KOH, since the amount of $Na_2CO_3$ present in the carbonate mixture more nearly approaches the theoretical 25% than does the $K_2CO_3$ value.

The experiments described in the next two examples are made in the same equipment as that described for Examples 7 to 12 above, and a solution of potassium hydroxide (45% by weight) is used as the source of the carbonate, under the conditions and with the results shown in the table below.

| Examples | 13 | 14 |
|---|---|---|
| Atomizing Pressure (p.s.i.g.) | 3,500 | 3,600 |
| Air Rate (s.c.f.m.) | 4,000 | 3,000 |
| Residence Time (sec.) | 4.1 | 5.5 |
| Inlet temperature (°F.) | 400 | 450 |
| Outlet temperature (°F.) | 310 | 304–310 |
| Density (lbs./ft.3) | 31.0 | 30.1 |
| Combustion $CO_2$ (lbs./hr.)* | 171 | 149 |
| Percent Conversion | 99.66 | 99.55 |

*Theoretical.

While there have been described various embodiments of the invention, the methods described are not intended to be understood as limiting the scope of the invention as it is realized that changes therein are possible and it is further intended that each element recited in any of the following claims is to be understood as referring to all equivalent elements for accomplishing substantially the same results in substantially the same or equivalent manner, it being intended to cover the invention broadly in whatever form its principles may be utilized.

What is claimed is:

1. A method of producing an alkali metal carbonate comprising the steps of forming discrete particles of a solution of an alkali metal hydroxide in a reaction chamber, injecting a heated gas containing carbon dioxide into said chamber, the amount of carbon dioxide in said chamber being in excess of that required to react with the alkali metal hydroxide in said particles of said solution, allowing particles of said solution to move generally concurrently with the movement of said gas in said chamber, maintaining the average minimum reaction temperature in said chamber above about 200° F., maintaining the relative humidity of said gas such that water is vaporized from said solution, whereby the alkali metal hydroxide is reacted with the carbon dioxide and is converted to the corresponding alkali metal carbonate in a dry particulate form, and removing said dry particulate alkali metal carbonate and the remainder of said gas from said chamber.

2. The method of producing sodium carbonate which includes the steps of forming discrete particles of a solution of sodium hydroxide within a reaction zone, contacting the particles of said solution in said zone with a heated gas containing carbon dioxide, maintaining the average minimum reaction temperature in said zone above about 200 °F., the amount of carbon dioxide in said zone being in excess of that required to react with the sodium hydroxide in said solution, allowing particles of said solution to move generally concurrently with the movement of said gas in said chamber, maintaining the relative humidity of said gas such that water is vaporized from said solution, whereby said carbon dioxide reacts with the sodium hydroxide of said solution, and a dry particulate sodium carbonate is formed, and removing said sodium carbonate and the remainder of said gas from said zone.

3. The method of producing potassium carbonate which includes the steps of forming discrete particles of a solution of potassium hydroxide within a reaction zone, contacting the particles of said solution in said zone with a heated gas containing carbon dioxide, maintaining the average minimum reaction temperature in said zone above about 200° F., the amount or carbon dioxide in said zone being in excess of that required to react with the potassium hydroxide in said solution, allowing particles of said solution to move generally concurrently with the movement of said gas in said chamber, maintaining the relative humidity of said gas such that water is vaporized from said solution, whereby said carbon dioxide reacts with the potassium hydroxide of said solution and a dry particulate potassium carbonate is formed, and removing said potassium carbonate and the remainder of said gas from said zone.

4. The method of producing a mixture of sodium and potassium carbonates comprising the steps of forming discrete particles of a solution of a mixture of sodium and potassium hydroxides in a reaction zone, contacting the particles of said solution in said zone with heated carbon dioxide-containing gas, the amount of carbon dioxide in said zone being in excess of that required to react with the mixture of said hydroxides in said particles of said solution, maintaining the average minimum reaction temperature in said zone above about 200° F., allowing particles of said solution to move generally concurrently with the movement of said gas in said zone, maintaining the relative humidity of said gas such that water is evaporated from said solution, whereby said carbon dioxide reacts with the mixture of said hydroxides and forms a mixture of said carbonates in particulate form, and removing said mixture of said carbonates and the remainder of said gas from said zone.

5. The method as claimed in claim 1 in which the alkali metal hydroxide solution contains between about 45% and 50% by weight alkali metal hydroxide.

6. The method of claim 1 wherein the gas containing carbon dioxide is injected into said chamber at a temperature above about 800° F., and the remainder of said gas is withdrawn from said chamber at a temperature above about 225° F.

7. A method as claimed in claim 5 wherein the gas containing carbon dioxide is injected into said chamber at a temperature above about 800° F., and the remainder of said gas is withdrawn from said chamber at a temperature above about 225° F.

8. The method as claimed in claim 7 wherein at least a portion of the alkali metal carbonate product is recycled as a slurry in the alkali metal hydroxide solution.

9. The method as claimed in claim 2 wherein the gas containing carbon dioxide is injected into the reaction zone at a temperature above about 800° F., and the remainder of said gas is withdrawn at a temperature above about 225° F.

10. The method as claimed in claim 2 wherein the sodium hydroxide solution contains about 50% by weight sodium hydroxide.

11. The method as claimed in claim 9 wherein the sodium hydroxide solution contains about 50% of sodium hydroxide by weight.

12. The method as claimed in 11 in which at least a portion of the sodium carbonate product is recycled as a slurry in the sodium hydroxide solution.

13. The method of claim 3 wherein the potassium hydroxide solution contains about 45% of potassium hydroxide by weight, and the average minimum reaction temperature is above about 300° F.

14. The method of claim 4 wherein the alkali metal hydroxide content of the solution of said hydroxides amounts to about 24% of sodium hydroxide by weight and about 76% of potassium hydroxide by weight.

References Cited by the Examiner

UNITED STATES PATENTS 2,780,520   2/57   Pike _____ 23—63

FOREIGN PATENTS 776,331   6/57   Great Britain.

OTHER REFERENCES

Perry: Chemical Engineer's Handbook, 3rd edition, 1950, pages 704–705. TP155 P4.

MAURICE A. BRINDISI, *Primary Examiner.*